United States Patent Office 3,325,016
Patented June 13, 1967

3,325,016
FILTER EARTHS
Karl Angst, Zurich, Switzerland, assignor to Deutsche Babcock & Wilcox-Dampfkessel-Werke Aktien-Gesellschaft, Oberhausen, Rhineland, Germany
No Drawing. Filed Aug. 18, 1964, Ser. No. 390,444
6 Claims. (Cl. 210—500)

Air and gas filters respectively were created as gas protection filters especially during World War I for use in gas masks and collective filters for air raid shelters. Previously, activated carbon filters were considered adequate filters, particularly against war gases, however, smoke gases are incompletely filtered by the activated carbon filter. Therefore, as there were no other equivalent filters available, they were replaced by "earth filters." But, these earth filters also failed. The failure of the filters was attributed principally to earth components such as sand, clay and lime, as well as to the water contained therein. However, many years experience has shown that while the earth itself acts as a mechanical filter, the main purifying work must be attributed to the organic components of the earth.

In order to use the earth as a filter, a pit of, for instance, one cubic meter is opened, and the ceiling and part of the side walls are hermetically closed. The air is removed from this pit to create a vacuum therein, to cause air to flow from the surrounding earth into the pit. In the surrounding earth, the air that has been drawn off is gradually replaced by atmospheric air which becomes purified as it is filtered on its long way through the narrow passage in the earth.

As already mentioned before, the filter effect of the earth is attributed principally to its organic components. Therefore, among other things, compost earth rich in humus and bacteria was used as filter mass. But, the preparation of such an earth is complicated and expensive. The rotting of the basic materials often takes up several years. The collecting of sufficient quantities or organic by-products as leaves, hay, peat, grass, garden by-products, etc. is difficult and even impossible in many regions. The organic degradation or rotting process involves losses of organic substances and nitrogen, and this is the reason why such manure is too expensive as a basic material.

In order to eliminate these disadvantages, a complementary mixture has been proposed, consisting of peat dust, activated forest earth and mineral manures. This mixture is then composted and shoveled during several weeks before it is ready for use, whereby losses of the essential filter materials can not be avoided.

The invention concerns the preparation of earths being apt for the filtering and which serve for the neutralization of odors (deodorization), disintoxication and retention of precious substances for regeneration.

According to the invention, forest earth, especially leafy wood earth, is homogeneously mixed with loosened peat dust in a volume proportion of about 2:1. The mixture is passed through a screen with meshes in the range of 10 to 15 mm. of width. After that, 10–20 kgs. of mineral manure are to add per cubic meter. After repeated shoveling, the whole gives a homogeneous mixture. Sand or pure clay or clayey sand may be added also. The fine clay particles and the humuseous components offer a wide surface of adsorption. The peat improves the structure of the filter mass, but it acts itself also as a filter. It prevents sticking of clay particles and, therefore, permits a better aeration of the substratum. At the same time, the peat contributes to fix filter materials and water. Thus, its tasks are principally physical ones.

As additional manures, organic-biological additions, preferably organic manures, in powder form may be used, as for instance bone meal, fish by-products, etc. But, they may be added to the mixture also in a soluble form or as a watery deposit. Besides these enriching materials, tracer elements and effective substances of any kind may be added. One can add also substances such as activated carbon to render the filter process more adsorptive or to enable a regeneration of the earth filter mass. Living things such as worms and bacteria cultures, being good examples of regenerating substances.

Above all, however, the above recited basic materials should be used. They are available everywhere in sufficient quantities or could be supplied also from the industry in sufficient quantities and uniform quality. When adding chemicals, care is to be taken in appropriate circumstances, that no water soluble substances be added as they can harm the underground-water streams.

The crushing of the basic materials may be effected in pre-dried condition by machine or manually. The filter earth, prepared according to the invention, is suitable for immediate use, but it should be stored preferably for several months, in order to permit the bacteria to develop themselves. Such storage preferably being done on limestone to accelerate such action.

Careful tests of the invention in gas filter plants have proved that the filter earth, prepared according to the invention, is superior to other filter substances in the following points:

(a) The basic materials may be procured easily and at moderate prices.
(b) Storing is not only possible but even useful, especially in those cases where old filter materials must be regenerated or where fresh ones have to be matured.
(c) The filter material can also be used immediately without storing. Moreover, the following qualities are important for successful filter action:
  (1) The proper crumbly structure of the filter earth will not be damaged even if the filter is used for a very long time.
  (2) The nutriments contained therein permit the bacteria a very good development during storing as well as when used as filter materials.
  (3) The filter earth has an excellent water-retaining power. Therefore moistening may be omitted or limited to a minimum. The intensity of moistening depends on the structure of the medium that is to be filtered.

According to the invention, one or several kinds of forest filter earths are prepared which may be adapted to different purposes by means of additives, such as living earth organisms in the form of bacteria colonies which can be cultivated in cultures, or earth worms; organic materials, such as leaves, fir needles and grass in green, dried, decayed or rotten condition in the entirety, crushed or powdered form; peat and others more. Good examples of such materials are straw, litter, reed, peat, and coal. As an example of a typical filter according to the present invention, one can take 500 litres of forest earth rich in humus and bacteria and 250 litres of pre-dried peat, crushed, homogeneously mixed and screened to a maximum grain size of 10 mm. Organic manures and bacteria will be in the mixture in the approximate amount of 10 kg. of a manure mixture consisting of: 2 parts of ammonium sulphate, 2.5 parts of superphosphate and 1.2 parts of potassium sulphate.

Although the filter material herein is especially for cleaning gases, it is effective in the filtration of liquids and solids.

What is claimed is:
1. An earth air and gas filter material consisting essentially of forest earth rich in humus and bacteria that has been reduced in size and homogeneously mixed with screened peat dust in a volume proportion of 2 parts of said earth to 1 part peat, characterized that the mixture is homogeneously permeated with organic manures and bacteria.

2. The filter material of claim 1 in which said earth and peat mixture has been screened to pass through a screen in the range of 10 to 15 millimeter width.

3. The filter material of claim 1 in which the organic manures and bacteria are present in the range of 10 to 20 kilograms per cubic meter of the mixture.

4. The filter material of claim 1 in which there are living earth organisms homogeneously distributed.

5. A process for making an air and gas filter material comprising mixing forest earth rich in humus and bacteria with a screened peat dust in a volume proportion of two parts of said earth to one part peat, screening said earth and peat mixture to pass through a screen in the range of 10 to 15 millimeters width and providing organic manures and bacteria homogeneously throughout said mixture and arranging said screened mixture rich in organic manures and bacteria to filter gas in which odors are neutralized and the gas is disintoxicated.

6. In the process of preparing an earth filter material, the steps comprising mixing 2 parts by volume of forest earth rich in humus with 1 part screened peat dust with such mixture being rich in bacteria content and contacting such mixture with limestone by storing the mixture on limestone for a period to accelerate the bacteriological growth therein.

References Cited

UNITED STATES PATENTS

| | | | |
|---|---|---|---|
| 644,637 | 3/1900 | Reid | 210—502 X |
| 1,922,416 | 8/1933 | Block | 252—426 X |
| 1,938,647 | 12/1933 | Earp-Thomas | 71—24 X |
| 2,158,918 | 5/1939 | Townsend | 71—24 |
| 2,283,174 | 5/1942 | Bates et al. | 210—502 X |
| 2,750,269 | 6/1956 | Klein | 71—23 X |

LEON D. ROSDOL, *Primary Examiner.*

I. GLUCK, *Assistant Examiner.*